(12) United States Patent     (10) Patent No.:    US 12,654,249 B2

Link et al.              (45) Date of Patent:     Jun. 16, 2026

---

(54) WIRE SPOOL CLUTCH

(71) Applicant: Lincoln Global, Inc., Santa Fe Springs, CA (US)

(72) Inventors: Adam E. Link, Grafton, OH (US); Matthew A. Weeks, Walloon (AU)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 1014 days.

(21) Appl. No.: 17/847,672

(22) Filed: Jun. 23, 2022

(65)          Prior Publication Data

US 2023/0017476 A1     Jan. 19, 2023

Related U.S. Application Data

(60) Provisional application No. 63/222,516, filed on Jul. 16, 2021.

(51) Int. Cl.
| | |
|---|---|
| B23K 9/133 | (2006.01) |
| B33Y 30/00 | (2015.01) |
| F16D 7/02 | (2006.01) |

(52) U.S. Cl.
CPC ............ B23K 9/1336 (2013.01); B33Y 30/00 (2014.12); F16D 7/025 (2013.01)

(58) Field of Classification Search
CPC .... B23K 9/133; B23K 9/1333; B23K 9/1336; B23K 9/1735; B33Y 30/00; B65H 2701/36; B65H 49/34; B65H 59/04; F16D 7/025
USPC ..... 219/130.1, 137.2; 242/423–423.2, 594.3, 242/598.4
See application file for complete search history.

(56)            References Cited

U.S. PATENT DOCUMENTS

| | | | |
|---|---|---|---|
| 2,971,707 A | * | 2/1961 | Jacobs, Jr. ........... B65H 67/056 |
| | | | 242/474.9 |
| 3,907,229 A | | 9/1975 | Iannucci et al. |
| 4,375,279 A | | 3/1983 | Koch |
| 4,494,710 A | | 1/1985 | Harris et al. |
| 5,337,972 A | * | 8/1994 | Bhagwat ................ B65H 59/02 |
| | | | 242/423.1 |
| 5,425,830 A | | 6/1995 | Bhagwat et al. |

(Continued)

FOREIGN PATENT DOCUMENTS

| | | |
|---|---|---|
| EP | 3 656 496 A2 | 5/2020 |
| GB | 2 002 267 A | 2/1979 |

OTHER PUBLICATIONS

Webster definition to "clutch" (Year: 2025).*

(Continued)

*Primary Examiner* — Helena Kosanovic
*Assistant Examiner* — Bonita Khlok
(74) *Attorney, Agent, or Firm* — Brad C. Spencer

(57)           ABSTRACT

A welding or additive manufacturing wire drive system includes a spindle. First and second welding wire spools are mounted on the spindle. The spools include a flange, a mounting hub, a barrel, and a wire electrode wound on the barrel. At least two drive rolls simultaneously draw first and second wire electrodes from the spools. A clutch disk is mounted on the spindle and has respective frictional surfaces in contact with one or both of the flange and mounting hub on the spools to frictionally engage the spools. The clutch disk allows the spools to slip relative to each other during an operation of the at least two drive rolls such that the spools rotate at different speeds while the wire electrodes are drawn from the spools.

10 Claims, 8 Drawing Sheets

(56)         References Cited

U.S. PATENT DOCUMENTS

| | | | |
|---|---|---|---|
| 5,725,175 | A | 3/1998 | Thundathil |
| 6,499,524 | B1 | 12/2002 | Miller et al. |
| 7,531,205 | B2 | 5/2009 | Selvamanickam et al. |
| 10,167,168 | B1 | 1/2019 | Bonner |
| 10,610,946 | B2 | 4/2020 | Albrecht et al. |
| 2006/0000093 | A1 | 1/2006 | Kobayashi et al. |
| 2009/0188896 | A1 | 7/2009 | Khakhalev et al. |
| 2014/0312021 | A1* | 10/2014 | Stanzel ................ B23K 9/1336 |
| | | | 219/137 R |
| 2020/0156171 | A1 | 5/2020 | Albright et al. |
| 2020/0189019 | A1* | 6/2020 | Bombardier ....... B23K 35/0266 |
| 2023/0017476 | A1 | 1/2023 | Link et al. |

OTHER PUBLICATIONS

Behera, et al.; "Development of a Compact Wire Feeding Mecha-
nism for Micro Electro Discharge Grinding;" https://lirias.kuleuven.
be/retrieve/148829; 21st All India Manufacturing Technology, Design
and Research Conference, Edition 21; Dated Dec. 2004; pp. 1-6.
International Search Report and Written Opinion from Correspond-
ing Application No. PCT/US2024/034270; Dated Oct. 31, 2024; pp.
1-12.

* cited by examiner

WIRE SPOOL CLUTCH

CROSS-REFERENCE TO RELATED APPLICATIONS

The present application claims priority to U.S. Provisional Patent Application Ser. No. 63/211,588 filed on Jun. 17, 2021, and claims priority to U.S. Provisional Patent Application Ser. No. 63/222,516 filed on Jul. 16, 2021, the disclosures of which are incorporated herein by reference.

BACKGROUND OF THE INVENTION

Field of the Invention

The present invention relates to a wire drive system for dual wire welding or additive manufacturing.

Description of Related Art

When welding, it is often desirable to increase the width of the weld bead or increase the length of the weld puddle during welding. There can be many different reasons for this desire, which are well known in the welding industry. For example, it may be desirable to elongate the weld puddle to keep the weld and filler metals molten for a longer period of time so as to reduce porosity. That is, if the weld puddle is molten for a longer period of time there is more time for harmful gases to escape the weld bead before the bead solidifies. Further, it may desirable to increase the width of a weld bead so as to cover wider weld gap or to increase a wire deposition rate. In both cases, it is common to use an increased electrode diameter. The increased diameter will result in both an elongated and widened weld puddle, even though it may be only desired to increase the width or the length of the weld puddle, but not both. However, this is not without its disadvantages. Specifically, because a larger electrode is employed more energy is needed in the welding arc to facilitate proper welding. This increase in energy causes an increase in heat input into the weld and will result in the use of more energy in the welding operation, because of the larger diameter of the electrode used. Further, it may create a weld bead profile or cross-section that is not ideal for certain mechanical applications.

Rather than increasing the diameter of the electrode, it may be desirable to weld using two smaller wire electrodes simultaneously. The two wire electrodes can be wound on separate spools and driven by a wire feeder through a welding torch during a deposition operation. It can be desirable at certain times for the two spools to rotate together at the same speed during wire feeding while providing for the possibility that the spools should rotate at different relative speeds or angular velocities (i.e., one spool rotating faster than the other during wire feeding).

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding or additive manufacturing wire drive system. The system comprises a spindle. A first welding wire spool is mounted on the spindle and comprises a first flange, a first mounting hub, a first barrel, and a first wire electrode wound on the first barrel. A second welding wire spool is mounted on the spindle and comprises a second flange, a second mounting hub, a second barrel, and a second wire electrode wound on the second barrel. At least two drive rolls simultaneously draw the first wire electrode from the first welding wire spool and the second wire electrode from the second welding wire spool. A clutch disk is mounted on the spindle and has a first frictional surface in contact with one or both of the first flange and the first mounting hub, and has a second frictional surface in contact with one or both of the second flange and the second mounting hub to frictionally engage the first welding wire spool to the second welding wire spool. The clutch disk allows the first welding wire spool to slip relative to the second welding wire spool during an operation of the at least two drive rolls such that the first welding wire spool and the second welding wire spool rotate at different speeds while the first wire electrode is drawn from the first welding wire spool and the second wire electrode is drawn from the second welding wire spool.

In accordance with another aspect of the present invention, provided is a welding or additive manufacturing wire drive system. The system comprises a spindle. A first welding wire spool is mounted on the spindle and comprises a first flange, a first mounting hub, a first barrel, and a first wire electrode wound on the first barrel. A second welding wire spool is mounted on the spindle and comprises a second flange, a second mounting hub, a second barrel, and a second wire electrode wound on the second barrel. At least two drive rolls simultaneously draw the first wire electrode from the first welding wire spool at a wire feed speed and the second wire electrode from the second welding wire spool at the wire feed speed. A variable speed drive motor controls the wire feed speed. A clutch frictionally couples one or both of the first flange and the first mounting hub to one or both of the second flange and the second mounting hub. The clutch allows variation in a rotation rate of the first welding wire spool relative to the second welding wire spool during an operation of the at least two drive rolls while the first wire electrode is drawn from the first welding wire spool at the wire feed speed and the second wire electrode is drawn from the second welding wire spool at the wire feed speed.

In accordance with another aspect of the present invention, provided is a welding or additive manufacturing wire drive system comprising a first welding wire spool having a first flange, a second welding wire spool having a second flange, and a clutch located between the first flange and the second flange. The clutch includes a first clutch plate located adjacent the first flange and having a first frictional surface, a second clutch plate located adjacent the second flange and having a second frictional surface that contacts the first frictional surface, and an attachment hub extending through respective central openings in the first clutch plate and the second clutch plate. The attachment hub attaches the first clutch plate to the second clutch plate while permitting rotation of the first clutch plate relative to the second clutch plate.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
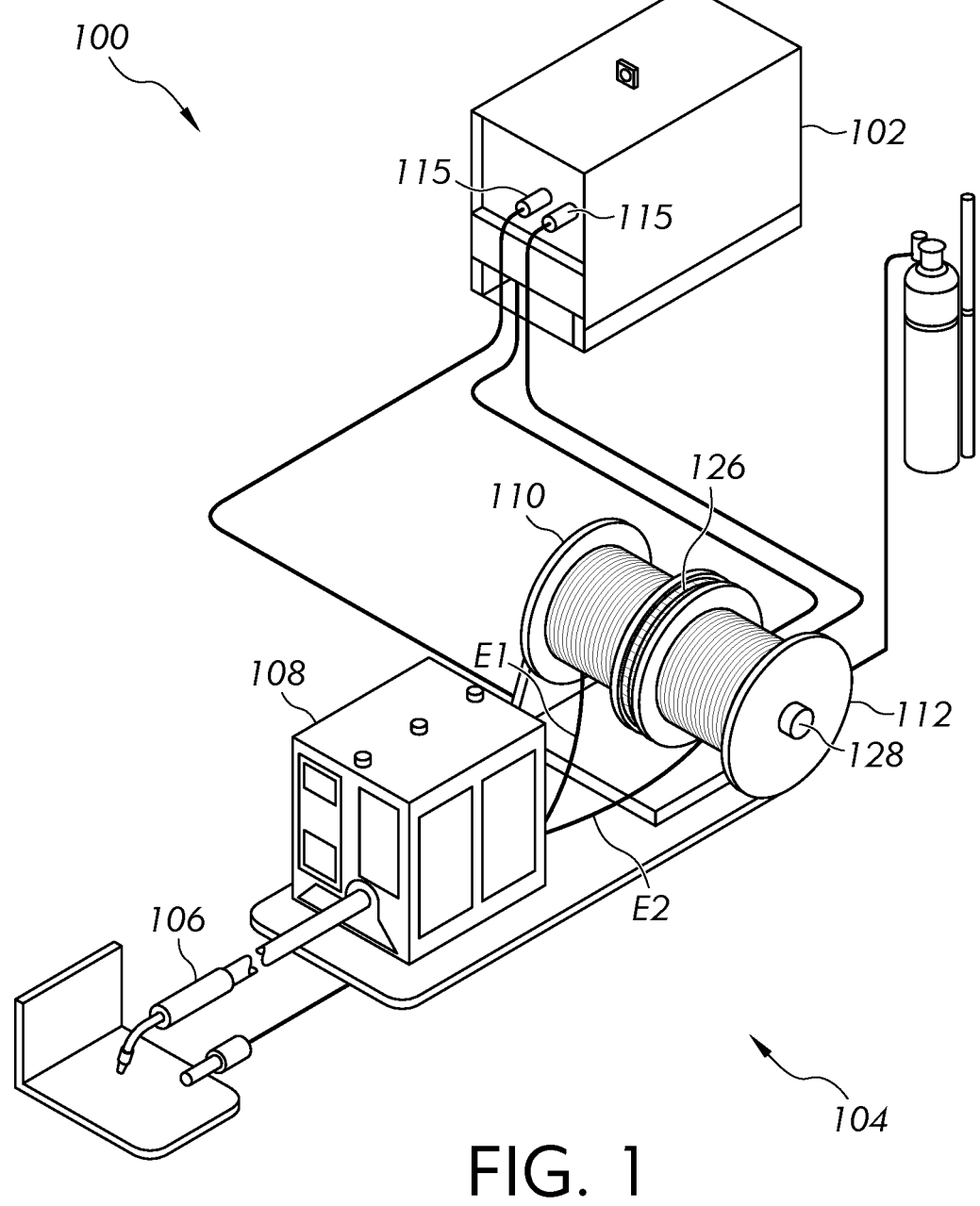
FIG. 1 is a perspective view of an example welding system.

The present invention relates to a wire drive system for dual wire welding or additive manufacturing. In particular, the present invention concerns a clutch mechanism that allows two separate welding wire spools to rotate together but also slip relative to one another should there be a mismatch in how the wires unwind from the spools.

The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

While embodiments of the present invention described herein are discussed in the context of a gas metal arc welding (GMAW) system, other embodiments of the invention are not limited thereto. For example, embodiments can be utilized in flux-cored arc welding (FCAW), metal-cored arc welding (MCAW), gas tungsten arc welding (GTAW) as well as other similar types of welding operations. Further, embodiments of the present invention can be used in manual, semi-automatic and robotic welding operations. Embodiments of the present invention can also be used in metal deposition operations that are similar to welding, such as additive manufacturing, hardfacing, and cladding. As used herein, the term "welding" is intended to encompass all of these technologies as they all involve material deposition to either join or build up a workpiece. Therefore, in the interests of efficiency, the term "welding" is used below in the description of exemplary embodiments, but is intended to include all of these material deposition operations, whether or not joining of multiple workpieces occurs.

Turning now to the figures, FIG. 1 provides a perspective view of an exemplary embodiment of a welding system 100. The welding system 100 contains a welding power source or power supply 102 which is coupled to both a wire drive system 104 and a welding torch 106. The power supply 102 can be any known type of welding power source capable of delivering welding current and welding waveforms, for example, pulse spray, STT and/or short arc type welding waveforms. Because the construction, design and operation of such power supplies are well known, they need not be described in detail herein. It is also noted that welding power can be supplied by more than one power supply at the same time—again the operation of such systems are known. The power supply 102 can include a controller which is coupled to a user interface to allow a user to input control or welding parameters for the welding operation. The controller can have a processor, CPU, memory etc. to be used to control the operation of the welding process and the generation of welding waveforms. The torch 106 can be constructed similar to known manual, semi-automatic or robotic welding torches and can be of a straight or gooseneck type. The wire drive system 104 includes a wire feeder 108 and electrode sources 110, 112 containing wire electrodes E1, E2. The wire feeder 108 draws the wire electrodes E1 and E2 or welding wires from the electrode sources 110, 112, respectively, which can be of any known type, such as reels, spools, containers or the like. In the example embodiments illustrated in the figures, the electrode sources 110, 112 are shown as welding wire spools. The wire feeder 108 employs drive rolls 114 (FIG. 2) to draw the wire electrodes E1 and E2 from the welding wire spools and push or pull the electrodes to the torch 106. The wire feeder 108 includes at least two drive rolls that simultaneously draw a first wire electrode E1 from a first welding wire spool at a wire feed speed and a second wire electrode E2 from a second welding wire spool at the wire feed speed during a deposition operation. The wire feed speed can be adjustable, such as based on a desired welding current, as is known in the art. The drive rolls 114 and wire drive system 104 are configured for a dual wire electrode welding operation. That is, they supply both wire electrodes E1, E2 simultaneously to the torch 106 for creating an arc and welding the workpiece W. As shown, the wire feeder 108 is operatively connected to the power source 102 consistent with known configurations of welding operations. The wire feeder 108 may include a drive assembly that utilizes power from one or more locomotive devices, such as an electric motor, that drive the wire electrodes E1, E2 to the application work site or workpiece W.

In certain embodiments, the wire electrodes E1, E2 can have different diameters. That is, embodiments of the present invention can use an electrode of a first, larger, diameter and an electrode of a second, smaller, diameter. In such an embodiment, it may be possible to more conveniently weld two workpieces of different thicknesses. For example, the larger electrode can be oriented to the larger workpiece while the smaller electrode can be oriented to the smaller workpiece. Further, embodiments of the present invention can be used for many different types of welding operations including, but not limited to, GMAW, SAW, FCAW, MCAW, and wire-fed GTAW. Additionally, embodiments of the present invention can be utilized with different electrode types. For example, it is contemplated that a cored electrode (e.g., flux-cored or metal-cored) can be coupled with a non-cored or solid electrode. Further, electrodes of differing compositions can be used to achieve desired weld properties and composition of the final weld bead. Two different, but compatible, consumables can be combined to create a desired weld joint. For example, compatible consumables such as hardfacing wires, stainless wires, nickel alloys and steel wires of different composition can be combined. As one specific example a mild steel wire can be combined with an overalloyed wire to make a 309 stainless steel composition. This can be advantageous when a single consumable of the type desired does not have desirable weld properties. For example, some consumables for specialized welding provide the desired weld chemistry but are extremely difficult to use and have difficulty providing a satisfactory weld. However, embodiments of the present invention allow for the use of two consumables that are easier to weld with to be combined to create the desired weld chemistry. Embodiments of the present invention can be used to create an alloy/deposit chemistry that is not otherwise commercially available, or otherwise very expensive to manufacture. Thus, two different consumables can be used to obviate the need for an expensive or unavailable consumable. Further, embodiments can be used to create a diluted alloy. For example, a first welding wire could be a common, inexpensive alloy and a second welding wire could be a specialty wire. The resulting deposit would be the average of the two wires, mixed well in the formation of a molten droplet, at the lower average cost of the two wires, over an expensive specialty wire. Further, in some applications, the desired deposit could be unavailable due to the lack of appropriate consumable chemistry, but could be achieved by mixing two standard alloy wires, mixed within the molten droplet and deposited as a single droplet. Further, in some applications, such as the application of wear resistance metals, the desired deposit may be a combination of tungsten carbide particles from one wire and chrome carbide particles from another. Still in another application, a larger wire housing larger particles within is mixed with a smaller wire containing fewer particles or smaller particles, to deposit a mixture of the two wires. Here the expected contribution from each of the wires is proportional to the size of wire. Further, although exemplary embodiments are discussed herein utilizing two wire electrodes simultaneously, other embodiments of the present invention can utilize more than two electrodes and electrode sources 110. For example, it is contemplated that a three or more electrode configuration can be utilized consistent with the descriptions and discussions set forth herein.

The welding power supply 102 may receive electrical input power from an outside source (e.g., utility power), that is directed to an onboard transformer and processor-controlled inverter or chopper circuitry, not depicted in the figures. Output from the power supply 102 may be provided through welding output terminals 115 or studs of the welding power supply. The welding gun or torch 106 may be electrically connected to the welding power supply 102 through the welding wire feeder 108 for delivering welding current to the workpiece W in a manner known in the art. It follows that the wire electrodes E1, E2 are fed through the torch 106 and metered out, i.e. dispensed, at the discretion of the application and/or end user in any manner suitable for conducting the welding process. It is noted that the wire electrodes E1, E2 conduct electricity for establishing a welding arc, wherein the electrodes are conveyed to the workpiece W having a voltage potential equal to or approximately equal to the output voltage of the welding power supply 102, which may be substantially greater than ground.

Different modes of conveying the wire electrodes E1, E2 are known in the art, an example of which includes pushing the electrodes to the torch 106 via power or torque provided by the locomotive device. Other modes of conveying the electrodes include push/pull modes that utilize multiple locomotive devices. The electrodes E1, E2 are delivered to the torch 106, which may have a trigger or other activation mechanism for dispensing the electrodes at the user's discretion. At times, it may be necessary to deliver the electrodes E1, E2 at varying rates of feed. Therefore, the locomotive device has an output that is adjustable for varying the linear wire feed speed (WFS) of the electrodes E1, E2. In particular, a drive motor of the wire feeder 108 may be a variable speed motor to adjust and control the WFS.

Figure 2:
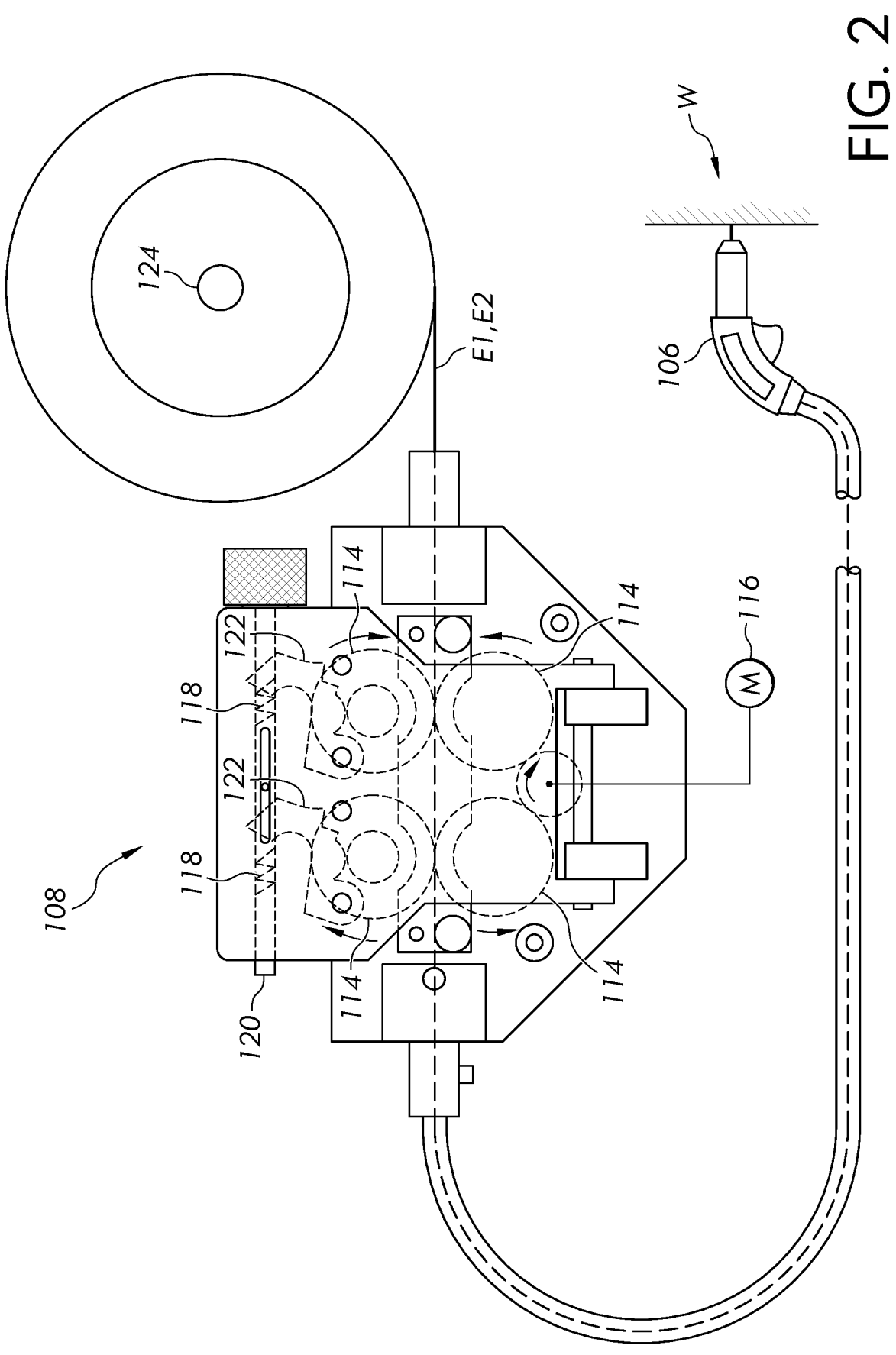
FIG. 2 is a side view of a portion of an example wire feeder.

Portions of an example wire feeder 108 having a variable speed drive motor 116 are shown schematically in FIG. 2. The wire feeder 108 and/or drive motor(s) 116 may draw operating power from the welding power supply 102, or an altogether separate power source. Still any manner of providing power to operate the welding wire feeder 108 and/or the drive motors 116 may be chosen with sound engineering judgment as is appropriate for use with the embodiments of the present invention.

The welding wire feeder 108 may include a drive assembly, or drive roll assembly. As mentioned above, the drive motor 116, also called a wire feeder motor, delivers power, i.e. torque, to convey the first and second welding wires E1, E2 through the wire feeder and to the torch 106 and subsequently to the workpiece W. Drive rolls 114 are included that grip the welding wires E1, E2 for pushing or pulling the welding wires simultaneously in the appropriate direction, i.e. toward the workpiece W. Sets of drive rolls 114 are vertically aligned and have corresponding aligned annular or circumferential grooves through which the welding wires E1, E2 pass simultaneously. The welding wires E1, E2 can be located together in the same circumferential grooves on the drive rolls 114 or located in separate circumferential grooves spaced axially apart along the outer surface of the drive rolls. It can be seen that the vertically-aligned sets of drive rolls 114 rotate in opposite directions to drive the welding wires E1, E2 through the wire feeder 108. For example, the upper drive rolls 114 rotate clockwise and the lower drive rolls rotate counterclockwise. The drive rolls 114 may be cylindrical in configuration, or more specifically disk-shaped, although the particular configuration should not be construed as limiting. The surface, i.e. the outer circumference, of the drive rolls 114 may be comprised of a sufficiently hardened material, like steel, that is durable and suitable for gripping the welding wires E1, E2. As shown, the drive rolls 114 may be disposed in pairs along the wire trajectory with each drive roll of the pair being supported on opposing sides of the welding wires E1, E2, such that respective outer circumferential portions of the rolls engage opposite sides of the wires (e.g., from above and below). It is noted that the central axes of respective drive rolls 114 extend substantially parallel with one another and generally transverse to the trajectory of the welding wires E1, E2. Although four drive rolls 114 are illustrated in FIG. 2, the wire feeder 108 can include fewer or more than four drive rolls if desired. In particular, the wire feeder 108 can have at least two drive rolls 114 that simultaneously draw the wire electrodes E1, E2 from their respective spools, at the wire feed speed.

The wire feeder 108 can include a biasing member that biases the vertically-aligned sets of drive rolls 114 toward one another. The biasing member sets the clamping force or compression that the drive rolls 114 apply to the welding wires E1, E2. For example, the wire feeder 108 can include biasing springs 118 that apply a bias force to one or more drive rolls 114 to set the compression that the drive rolls apply to the welding wires E1, E2. In the example embodiment of FIG. 2, the biasing springs 118 are mounted to an adjusting rod 120 that can be moved inward and outward to adjust the compression of the biasing springs 118. The force of the biasing springs 118 is transferred to the upper drive rolls 114 via pivoting levers 122. As noted above, the vertically-aligned sets of drive rolls 114 have corresponding aligned annular or circumferential grooves through which the wending wires E1, E2 pass.

Further details regarding the structure of welding wire feeders can be found in U.S. Pat. No. 5,816,466 issued on Oct. 6, 1998 and U.S. Pat. No. 8,569,653 issued on Oct. 29, 2013, both of which are incorporated herein by reference. The wire drive system 104 may be separate from the power supply 102 as shown in FIG. 1. However, the wire drive system 104, including the wire feeder 108 and spools 110, 112, may alternatively be incorporated into the power supply 102 as is known in the art.

The wire drive system 104 can include a spindle 124, and the wire spools 110, 112 can be mounted together on the spindle. The spindle 124 can be part of the wire feeder itself or located on a separate reel stand of the wire drive system. As the wire electrodes E1, E2 are drawn off of the spools 110, 112 at the WFS, the spools 110, 112 can rotate at the same speed or at different speeds. If the spools 110, 112 contain the same amount of welding wire, they will tend to rotate at the same speed during pay out of the wire. However, if the spools have differing amounts of wire, the more depleted spool can have a higher angular velocity than the adjacent spool despite paying out wire at the same WFS, due to the smaller radius and circumference of wire on the more depleted spool. It can be desirable that the spools mechanically engage each other to allow them to rotate together when possible, but also allow them to rotate at different speeds as needed. Described herein are clutch mechanisms or clutches that allows the two separate welding wire spools 110, 112 mounted together on the spindle 124 to rotate together but also slip relative to one another should there be a mismatch in how the wires unwind from the spools.

Figure 3:
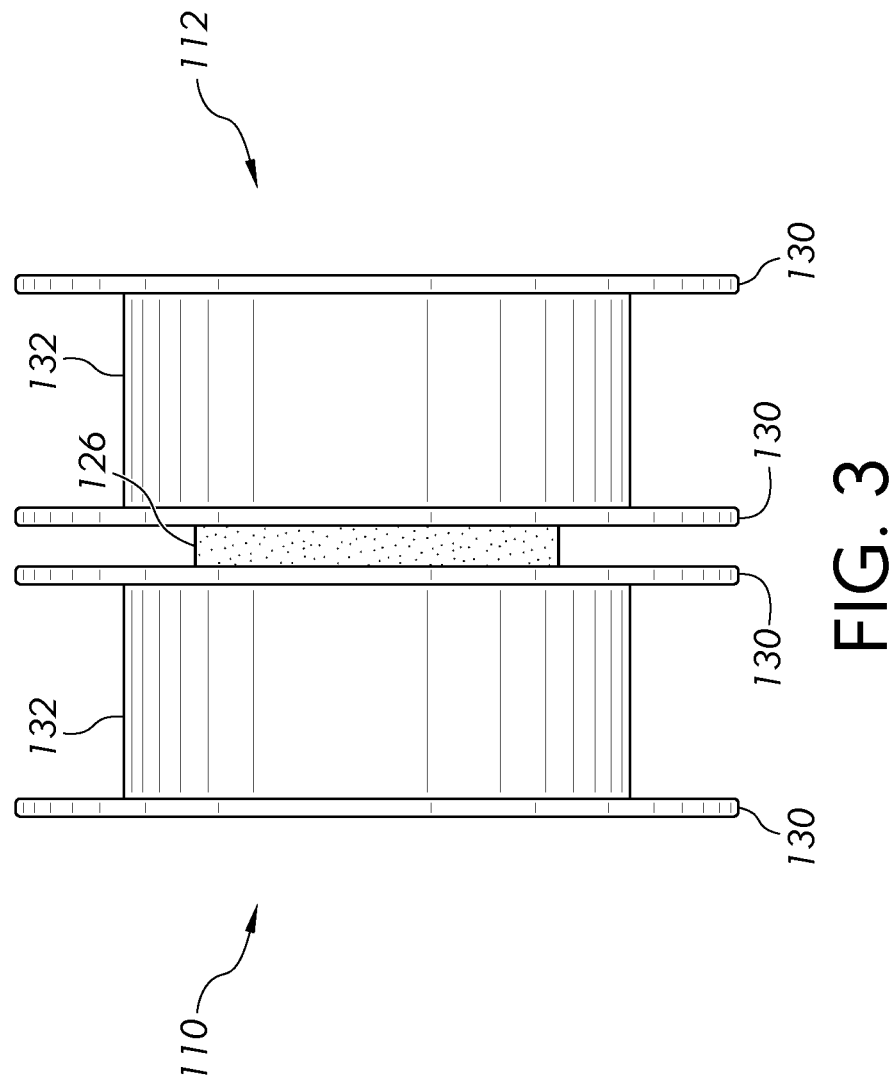
FIG. 3 shows first and second welding wire spools and a clutch disk.
Figure 4:
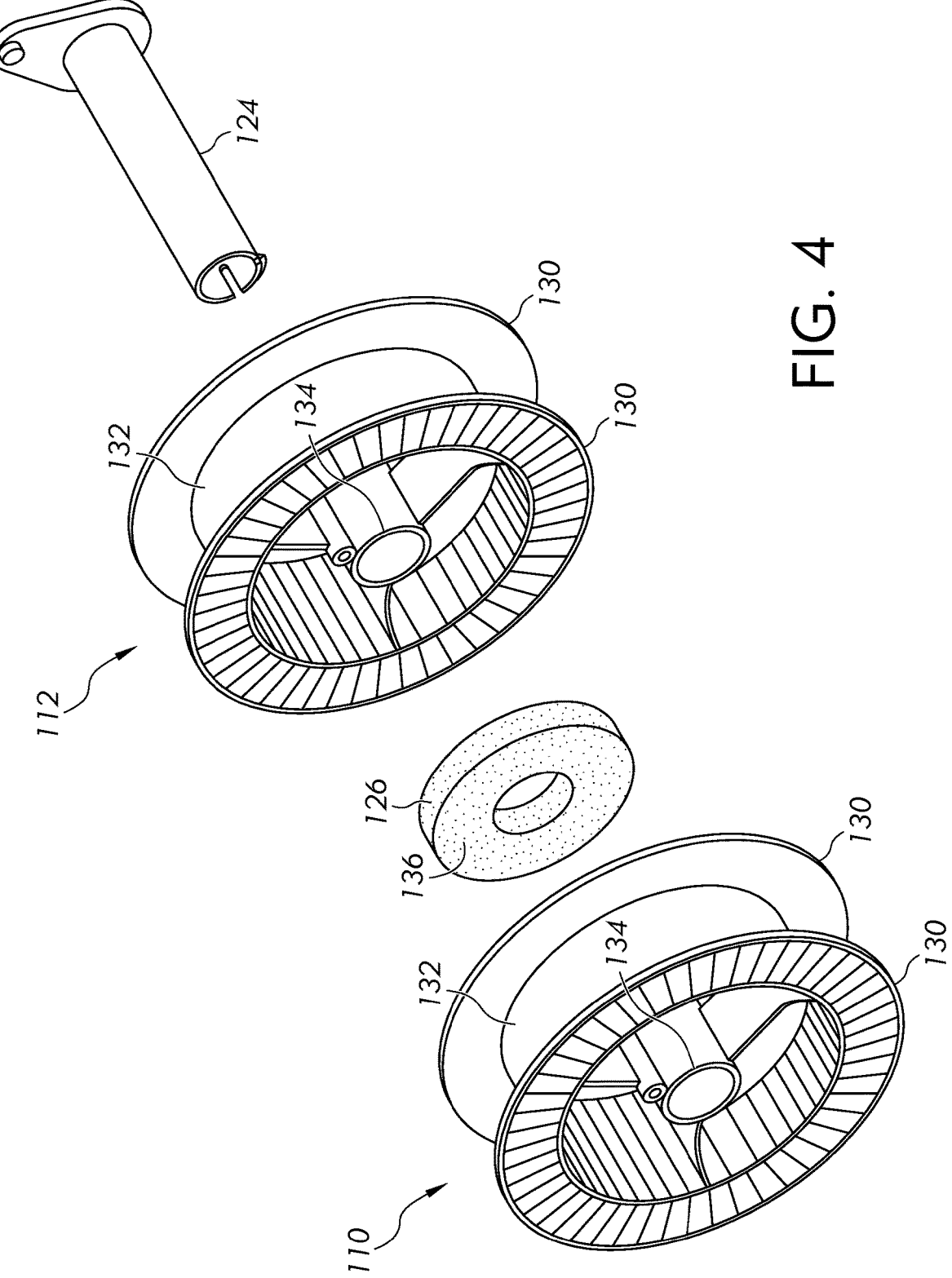
FIG. 4 is an exploded view of the first and second welding wire spools, the clutch disk, and a wire feeder spindle.

In one example embodiment shown in FIGS. 3 and 4, the clutch mechanism or clutch is formed by a clutch disk 126. The clutch disk 126 is mounted on the spindle 124 between the spools 110, 112. The spools 110, 112 have flanges 130 and a central barrel 132 extending between the flanges. The wire electrode is wound on the barrel 132 of the spool. The spools 110, 112 further have a mounting hub 134 located radially inward of the barrel 132 (e.g., the barrel 132 surrounds the mounting hub 134). The mounting hub 134 is generally cylindrical and allows the spool to be mounted on the spindle 124. The clutch disk 126 can be located between the spools 110, 112 (e.g., between the hubs 134, flanges 130 and barrels 132 of the spools).

The clutch disk 126 has an annular shape. The lateral surfaces of the clutch disk 126 are frictional surfaces 136 that allow the spools 110, 112 to frictionally engage each other (e.g., help pull each other along during wire feeding).

The wire drive system can include a spindle clamp 128 (FIG. 1) that secures the spools 110, 112 and the clutch disk 126 on the spindle 124. The spindle clamp 128 can also apply an axial force to the spools 110, 112 and the clutch disk 126. The frictional surfaces 136 of the clutch disk 126 contact one or both of the adjacent mounting hub 124 and flange 130 of the spool 110, 124 to frictionally engage the spools to each other. For example, the clutch disk 126 frictionally couples one or both of the flange 130 and mounting hub 124 of one spool 110 to one or both of the flange and mounting hub of the other spool 112. In an example embodiment, the frictional surface of the clutch disk 126 against a spool has a static coefficient of friction of 0.2 or greater. The clutch disk 126 could have a diameter equal to the diameter of the spool flanges 130 to contact the entire flange, or have a larger or smaller diameter than the flanges 130. In the embodiment of FIGS. 3 and 4, the clutch disk 126 has a smaller diameter than the flanges 130.

The clutch disk 126 allows variation in a rotation rate of one spool 110 relative to the other spool 112 during an operation of the drive rolls, while the wire electrodes are drawn from the spools at the WFS. In some instances, the clutch disk 126 and both spools 110, 112 will all rotate at the same speed, such as when the spools contain the same amount of wire. The clutch disk 126 also allows a spool to slip relative the other spool during an operation of the drive rolls while the wire electrodes are drawn from the spools at the WFS. The friction between the frictional surfaces 136 of the clutch disk 126 and spools 110, 112 is not so great as to prevent the spools from spinning separately or independently from each other. Thus, the clutch disk 126 allows the spools 110, 112 to rotate at speeds different from each other while the wire electrodes are drawn from the spools at the WFS, such as when the spools contain different amounts of wire.

The clutch disk 126 could be formed from a variety of materials that provided a suitable amount of friction between the frictional surfaces 136 of the clutch disk and the spools 110, 112. For example, the clutch disk 126 could be formed from an elastomeric material or from cork or a cork-like material. The clutch disk could be formed from a non-woven material, such as a sparse non-woven polymer or a felt. The clutch disk 126 could also have a surface treatment or coating applied to it to achieve the desired friction. For example, the clutch disk 126 could have abrasive surfaces similar to sand paper, or be formed from a metal or polymer and have a knurled finish. One of ordinary skill in the art will appreciate various possible materials of construction and/or surface finishes/treatments for the clutch disk to provide the clutch functionality discussed herein.

Figure 5:
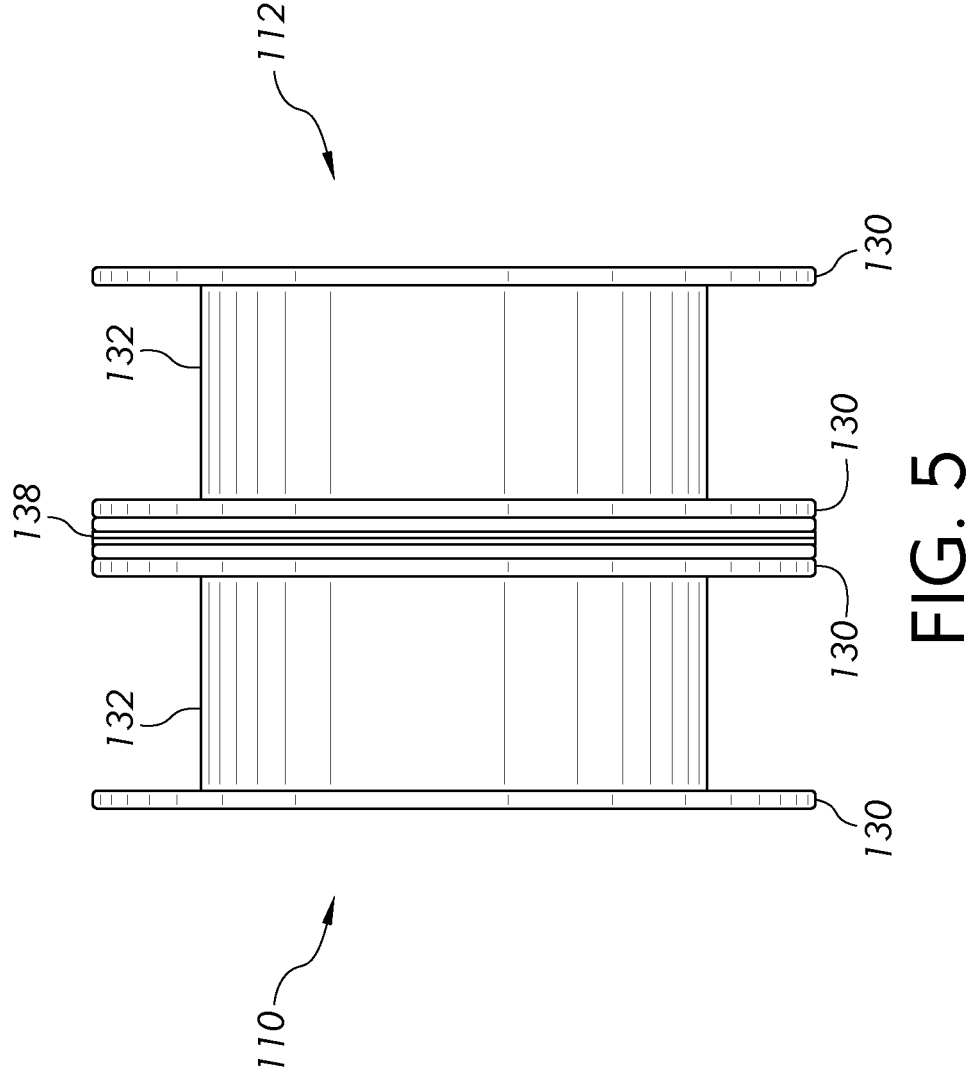
FIG. 5 shows first and second welding wire spools and a clutch mechanism.
Figure 6:
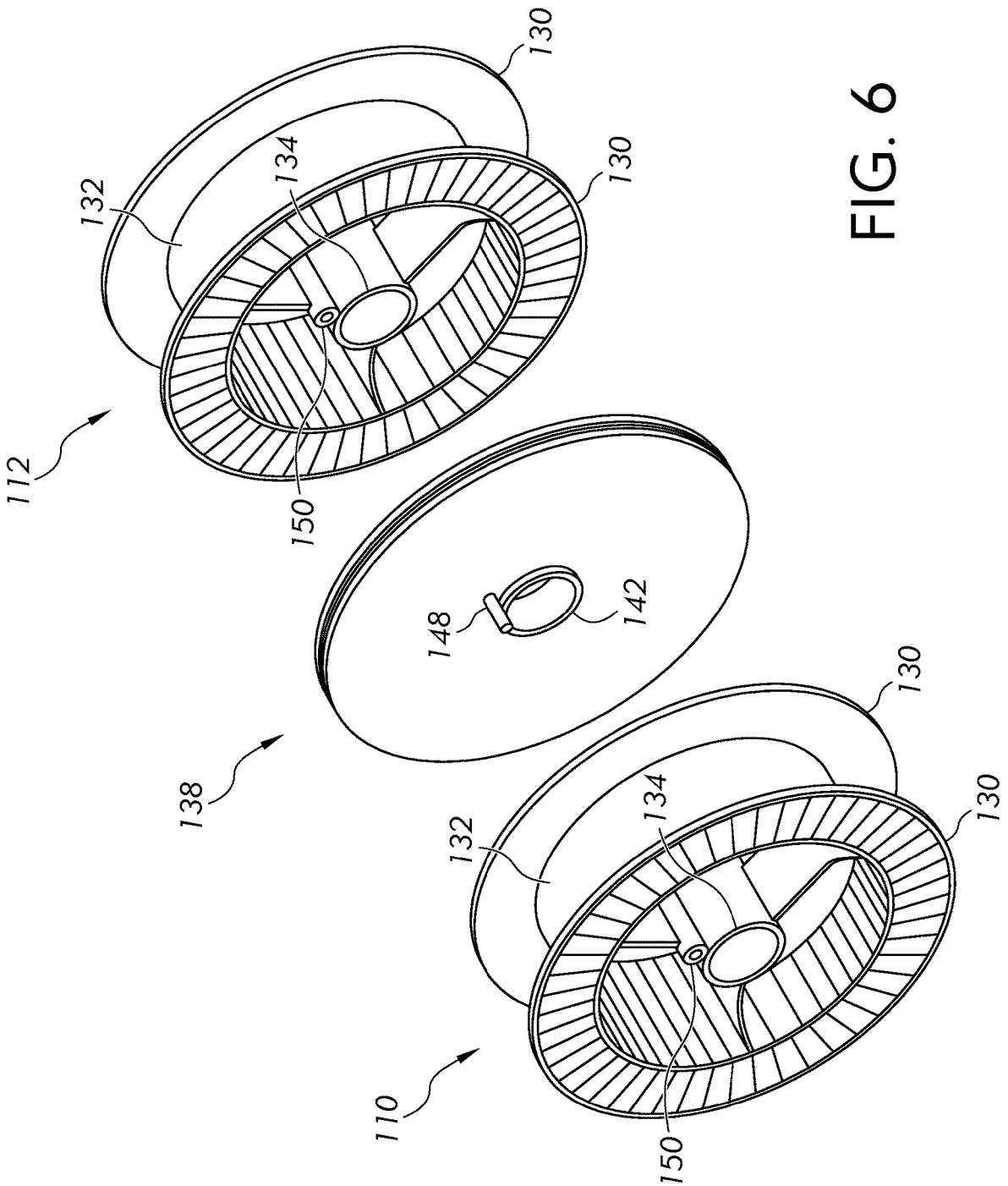
FIG. 6 is an exploded view of the first and second welding wire spools and the clutch mechanism.
Figure 7:
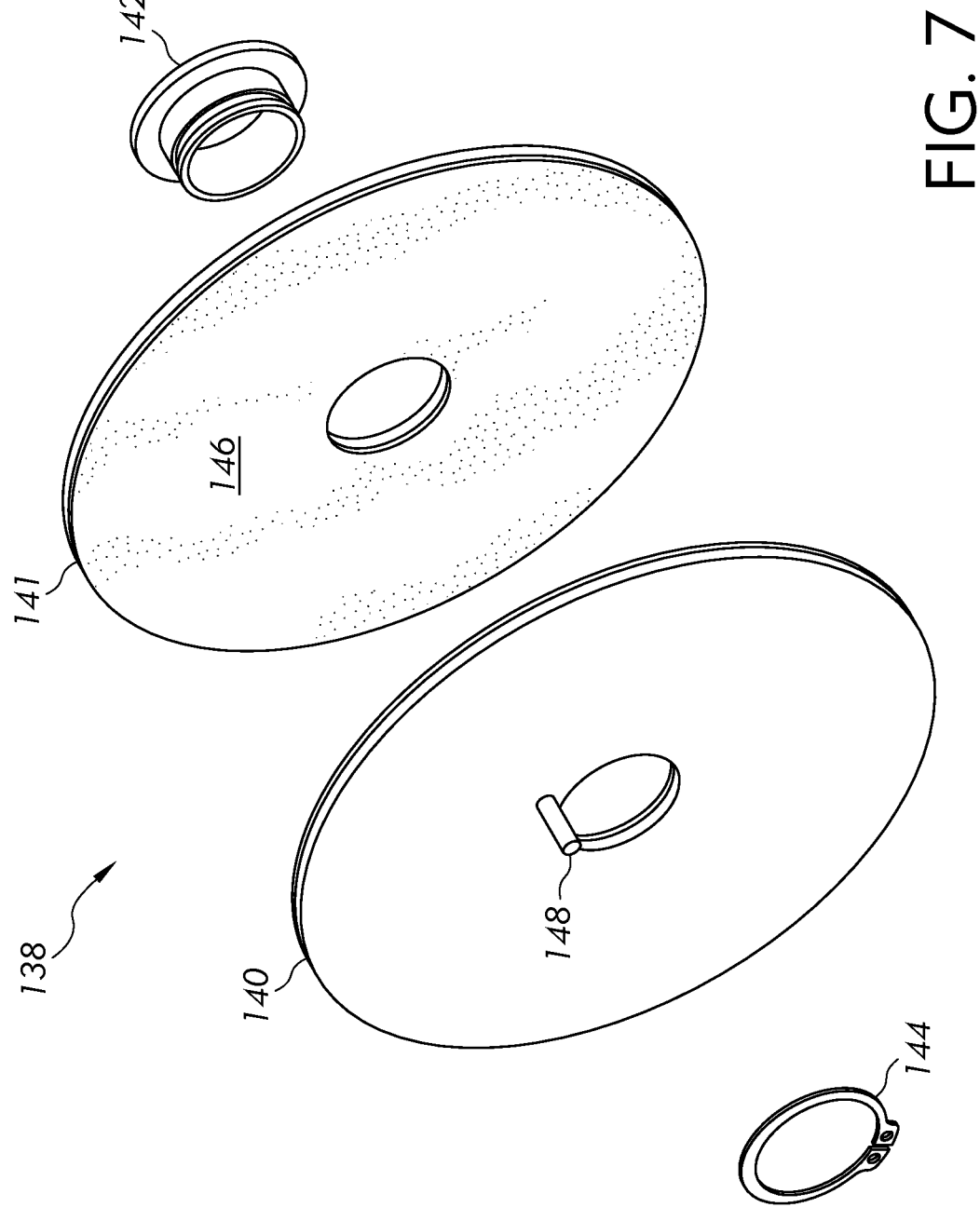
FIG. 7 is an exploded view of the clutch mechanism.

FIGS. 5-7 illustrate a further example embodiment of a clutch mechanism. Clutch 138 is located between respective flanges 130 on an inner and outer spool of the wire drive system. The clutch 138 includes a first clutch plate 140 located adjacent one spool flange on a first spool and a second clutch plate 141 located adjacent another spool flange on the second spool. The clutch plates 140, 141 are mounted on a flanged core support or attachment hub 142. In an example embodiment, the attachment hub 142 is inserted through central, axial openings in the clutch plates 140, 141 and held in place with a snap ring 144. The clutch plates 140, 141 are located between the annular flange at one axial end of the attachment hub 142 and the snap ring 144 at the opposite axial end of the hub. The attachment hub 142 thus extends through the central openings in the clutch plates 140, 141 and attaches the clutch plates together via its annular flange and snap ring 144. The clutch plates 140, 141 can rotate on the attachment hub 142 separate from one another and at different rotational speeds to allow the spools to slip relative to one another and allow a variation in the relative rotation rates of the spools during welding. However, the adjacent or facing surfaces 146 of the clutch plates 140, 141 are frictional surfaces having a high coefficient of friction to allow the clutch plates and attached spools to rotate together at the same speed. Example frictional surfaces 146 could be provided by materials and surfaces discussed above with respect to the clutch disk, and in an example embodiment the frictional surfaces 146 contacting each other have a static coefficient of friction of 0.2 or greater.

The clutch plates 140, 141 have a generally annular shape, and each clutch plate is connected to a respective welding wire spool 110, 112. There are various ways of attaching the clutch plates 140, 141 to the spools, such as via fasteners, clips, resilient catches, adhesives, etc. However, in the example embodiment shown in the figures, each clutch plate 140, 141 has a drive pin 148 that is inserted into a corresponding alignment hole or sleeve 150 on a spool 110, 112. When mounted on the spools 110, 112, the clutch plates 140, 141 are each located adjacent one of the spool flanges 130. The diameter of the clutch plates 140, 141 can closely match the diameter of the spool flanges 130, or be different, such as larger or smaller.

The clutch 138 allows the spools 110, 112 to pull each other along at the same speed during wire feeding, while also allowing the spools to slip relative to one another and unwind at different speeds. For example, if one spool has less wound wire than the other spool, it will rotate faster than the other spool during wire payoff. The clutch 138 allows this to occur. However, under normal feeding conditions with the amount of wire wound on each spool being approximately equal, the clutch plates 140, 141 will frictionally engage each other without slipping and rotate together at the same speed along with the spools 110, 112.

The clutch mechanisms discussed above are separate devices from the wire spools and are mounted between the spools on the spindle of the wire feeder. However, it is to be appreciated that clutch mechanisms could be built into the spools themselves, such as along the spool flanges. For example, frictional material could be attached to or embedded in the flanges to allow the spools to rotate together and slip relative to each other during wire pay off. Also, surface treatments or finishes could be applied to the spool flanges to obtain a desired amount of friction that is suitable to provide the clutch functionality discussed herein.

Figure 8:
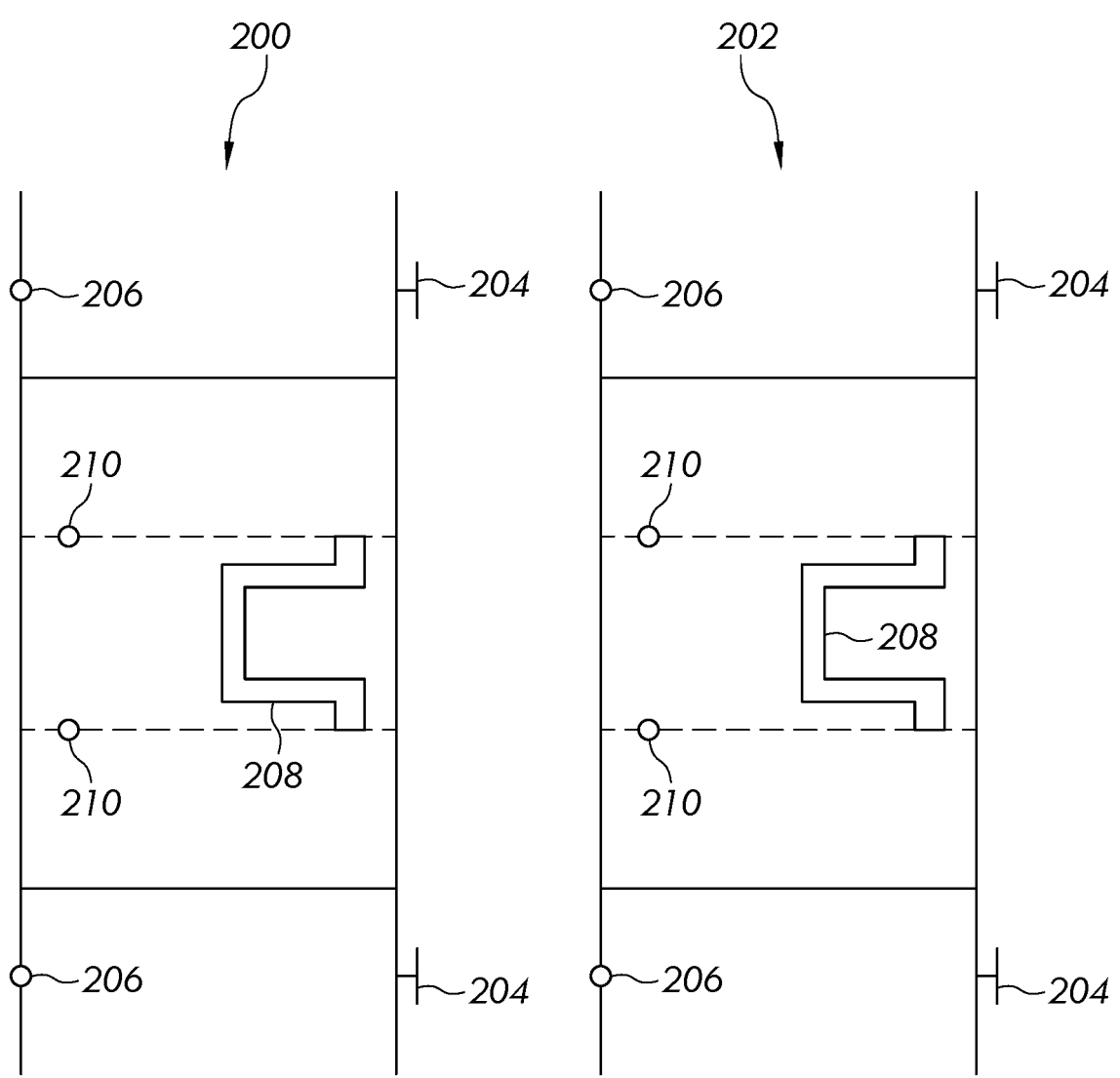
FIG. 8 is a schematic illustration of two attachable welding wire spools.

A conventional spindle for a wire feeder has a finger that projects radially to engage the hub or flange of the welding wire spool and capture it on the spindle. The finger is located at a standard axial distance (e.g., 2.118 inches) along the spindle so as to be compatible with wire spools having standard dimensions, such as a standard spool hub width (e.g., 2.118 inches for an 8 inch diameter spool). The finger is designed to grab the hub of a single welding wire spool and hold it on the spindle. A conventional spindle is not axially long enough to capture two spools. For a dual electrode welding operation, it can be desirable to use a conventional spindle on the wire feeder but attach two conventionally-sized wire spools to the spindle. To achieve this, the wire spools can be designed to allow one spool to be attached to or connected to another spool. An inner spool would be held by the spindle and an outer spool can attach to the inner spool. The spools could have attachment members to allow one spool to be attached axially to another spool. For example, one or both of the inner spool and the outer spool can have male and female attachment members, such as tabs, flared-head buttons, resilient fingers, slots, orifices, threaded surfaces or other engagement structures or surfaces. The attachment members could be located on the flanges of the spools and/or on the hub of the spools. FIG. 8 schematically shows two spools 200, 202 that have male attachment members 204 and corresponding female attachment members 206 located on the flanges of the spools that allow the spools to be attached together.

In certain embodiments, the male and/or female attachment members could be selectively deployable from a spool. This would allow a standard spool to be used as a single spool in single wire welding operations, and used in a dual wire welding operation when needed. For example, a spool flange or hub of a welding wire spool could include an axial movable element having male and/or female attachment members. When the axial movable element is in a not deployed position or is removed from the hub, the welding wire spool is configured to be attached to a spindle and could be used in a single wire welding operation. When the axial movable element is in a deployed or extended position, the welding wire spool can be attached to an adjacent (e.g., flange to flange) second welding wire spool for a dual wire welding operation. In an example embodiment, the welding wire spools include a movable hub located within the barrel of the spool. The hub has male and/or female members (e.g., resilient fingers) that are either recessed within the barrel when the hub is in a retracted position, or extended axially beyond the barrel when the hub is in an extended position. The fingers can be resilient (e.g., readily bendable in a radial direction of the spool) to grab onto portions of the flange, barrel, or hub of an adjacent spool located on the spindle of a wire feeder. The use of a movable hub can provide for a standard spool design that can be used for both single and dual wire welding applications. FIG. 8 schematically shows two spools 200, 202 that have a movable hub 208 that can be deployed for engaging an attachment recess or orifice or locking surface 210 within the hub or barrel of an adjacent spool. The movable hub 208 could also be removable to facilitate mounting the spool onto a spindle. Rather than employing a selectively deployable locking mechanism for the wire spools, the spools could have a resilient locking mechanism that is activated when the spools are pushed axially together (e.g., a grabbing mechanism utilizing cam surfaces for actuation), or the spools could employ a twist lock mechanism. In further embodiments, the spindle on the wire feeder can be axially long enough to accommodate two spools. The adjacent facing flanges of the spools could include friction surfaces discussed above that engage one another so that the spools pull each other along during wire feeding while allowing them to slip relative to one another and rotate at different speeds as necessary.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding or additive manufacturing wire drive system, comprising:

a spindle;

a first welding wire spool mounted on the spindle and
        comprising:

a first flange;

a first mounting hub;

a first barrel; and a first wire electrode wound on the first barrel;

a second welding wire spool mounted on the spindle and comprising:

a second flange;

a second mounting hub;

a second barrel; and a second wire electrode wound on the second barrel;

at least two drive rolls that simultaneously draw the first wire electrode from the first welding wire spool at a wire feed speed and the second wire electrode from the second welding wire spool at the wire feed speed;

a variable speed drive motor that controls the wire feed speed; and a clutch frictionally coupling one or both of the first flange and the first mounting hub to one or both of the second flange and the second mounting hub, wherein the clutch allows variation in a rotation rate of the first welding wire spool relative to the second welding wire spool during an operation of the at least two drive rolls while the first wire electrode is drawn from the first welding wire spool at the wire feed speed and the second wire electrode is drawn from the second welding wire spool at the wire feed speed, wherein the clutch includes a first clutch plate located adjacent the first flange and having a first frictional surface, a second clutch plate located adjacent the second flange and having a second frictional surface that contacts the first frictional surface, and further wherein the first clutch plate includes a first drive pin inserted in a first alignment hole on the first welding wire spool, and the second clutch plate includes a second drive pin inserted in a second alignment hole on the second welding wire spool.

2. The welding or additive manufacturing wire drive system of claim 1, wherein the clutch is located between the first flange and the second flange.

3. The welding or additive manufacturing wire drive system of claim 2, wherein the clutch is mounted on the spindle.

4. The welding or additive manufacturing wire drive system of claim 3, wherein the clutch has an annular shape.

5. A welding or additive manufacturing wire drive system, comprising:

a spindle;

a first welding wire spool mounted on the spindle and comprising:

a first flange;

a first mounting hub;

a first barrel; and a first wire electrode wound on the first barrel;

a second welding wire spool mounted on the spindle and comprising:

a second flange;

a second mounting hub;

a second barrel; and a second wire electrode wound on the second barrel;

at least two drive rolls that simultaneously draw the first wire electrode from the first welding wire spool at a wire feed speed and the second wire electrode from the second welding wire spool at the wire feed speed;

a variable speed drive motor that controls the wire feed speed; and a clutch frictionally coupling one or both of the first flange and the first mounting hub to one or both of the second flange and the second mounting hub, wherein the clutch allows variation in a rotation rate of the first welding wire spool relative to the second welding wire spool during an operation of the at least two drive rolls while the first wire electrode is drawn from the first welding wire spool at the wire feed speed and the second wire electrode is drawn from the second welding wire spool at the wire feed speed, wherein the clutch comprises a first clutch plate located adjacent the first flange and a second clutch plate located adjacent the second flange, and wherein the clutch further comprises an attachment hub extending through respective central openings in the first clutch plate and the second clutch plate, wherein the attachment hub attaches the first clutch plate to the second clutch plate while permitting rotation of the first clutch plate relative to the second clutch plate.

6. The welding or additive manufacturing wire drive system of claim 5, wherein the clutch comprises a first frictional surface that contacts the first flange and a second frictional surface that contacts the second flange.

7. The welding or additive manufacturing wire drive system of claim 5, wherein the clutch comprises a first frictional surface that contacts the first mounting hub and a second frictional surface that contacts the second mounting hub.

8. The welding or additive manufacturing wire drive system of claim 5, wherein the clutch is located between the first flange and the second flange.

9. The welding or additive manufacturing wire drive system of claim 5, wherein the clutch is mounted on the spindle.

10. The welding or additive manufacturing wire drive system of claim 9, wherein the clutch has an annular shape.

* * * * *